(12) United States Patent
Choi et al.

(10) Patent No.: US 6,999,153 B2
(45) Date of Patent: Feb. 14, 2006

(54) LIQUID CRYSTAL DISPLAY FOR TESTING DEFECTS OF WIRING IN PANEL

(75) Inventors: Gyo Un Choi, Seoul (KR); Yeong Koo Kim, Seoul (KR); Kon Ho Lee, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 350 days.

(21) Appl. No.: 10/034,458

(22) Filed: Dec. 28, 2001

(65) Prior Publication Data

US 2002/0085169 A1 Jul. 4, 2002

(30) Foreign Application Priority Data

Dec. 30, 2000 (KR) .......................... 2000-87509

(51) Int. Cl.
*G02F 1/13* (2006.01)

(52) U.S. Cl. ............................ 349/192; 349/40; 349/54; 349/190

(58) Field of Classification Search .................. 349/40, 349/54, 190, 192; 257/48, 59, 72; 354/3–4
See application file for complete search history.

(56) References Cited

U.S. PATENT DOCUMENTS

| | | | | |
|---|---|---|---|---|
| 4,884,875 A | * | 12/1989 | Okumura ..................... 349/24 |
| 5,298,891 A | * | 3/1994 | Plus et al. ..................... 345/93 |
| 5,652,632 A | * | 7/1997 | Shimizu ...................... 349/40 |
| 5,767,929 A | * | 6/1998 | Yachi et al. .................. 349/40 |
| 5,774,100 A | * | 6/1998 | Aoki et al. ................... 345/87 |
| 5,852,480 A | * | 12/1998 | Yajima et al. ................ 349/40 |
| 5,872,610 A | * | 2/1999 | Kobayashi ................. 349/139 |
| 6,014,191 A | * | 1/2000 | Kim et al. .................... 349/54 |
| 6,088,073 A | * | 7/2000 | Hioki et al. .................. 349/40 |
| 6,175,394 B1 | * | 1/2001 | Wu et al. ..................... 349/40 |
| 6,246,074 B1 | * | 6/2001 | Kim et al. .................... 257/48 |
| 6,327,007 B1 | * | 12/2001 | Shim ........................... 349/54 |
| 6,340,963 B1 | * | 1/2002 | Anno et al. ................... 345/92 |
| 6,356,320 B1 | * | 3/2002 | Chung et al. ................. 349/54 |
| 6,392,719 B1 | * | 5/2002 | Kim .............................. 349/40 |

FOREIGN PATENT DOCUMENTS

JP 03012637 A * 1/1991

* cited by examiner

*Primary Examiner*—Tom Thomas
*Assistant Examiner*—José R. Diaz
(74) *Attorney, Agent, or Firm*—Ladas & Parry LLP

(57) ABSTRACT

A liquid crystal display capable of testing defects of wiring in panel comprising a TFT array unit including a plurality of gate lines and data lines formed in a matrix shape, having TFT transistors at the intersection of each of the gate lines and the data lines; a data pad unit commonly connected to the plurality of data lines, for receiving signals for driving the data lines; and a wiring unit for testing defects in the data line, being connected between the data pad unit and the data line, and testing for disconnection and short anomalies of the data line.

9 Claims, 7 Drawing Sheets

LIQUID CRYSTAL DISPLAY FOR TESTING DEFECTS OF WIRING IN PANEL

BACKGROUND OF THE INVENTION

1. Field of the Invention

The present invention relates generally to a liquid crystal display and, more particularly, to a liquid crystal display capable of testing defects of wiring in a panel.

2. Description of the Prior Art

FIGS. 1A to 1C are drawings showing a module structure having a conventional liquid crystal display.

As shown in the drawings, FIG. 1A comprises a X-printed circuit board (X-PCB) 2 for supplying graphic signals to a panel 1, a Y-printed circuit board (Y-PCB) 4 for applying thin film transistor (TFT) driving signals and a flexible printed circuit (FPC) 7 for connecting the PCBs.

FIG. 1B shows a structure in which the FPC 7 is removed and FIG. 1C shows one in which that the Y-PCB 4 is removed and signals for driving a gate driver integrated circuit (IC) are applied through wiring in the panel 1.

As shown, panels of each module have different shapes and wiring for driving the gate driver IC is formed on the upper part of an array substrate of the panel.

FIG. 2 illustrates a conventional configuration for a panel test. Referring to FIG. 2, odd lines of data lines (D1, D2 ... D(2n+1)) are connected to data odd pad 17a and even lines of the data lines (D1, D2 ... D(2n)) are connected to data even pad 17b. In the same method, gate lines (G1, G2 ... Gn) are connected to gate odd pad 15a and gate even pad 15b. Vcom pad 13 is connected to all pixels of the TFT array 11 on the panel and wiring 20 is formed adjacent the corner of the upper part of panel 10.

Then, signals are applied to the five resulting pads in order to test whether a unit pixel is normally operated or not. That is, it is possible to test a short anomaly of a line and pixel by applying voltage to the gate odd pad 15a, the gate even pad 15b, the data odd pad 17a, the data even pad 17b and the Vcom pad 13.

However, the conventional liquid crystal display has a disadvantage in that it is difficult to test for anomalies, such as disconnection and short, by wiring formed on the upper part of panel, and further requires additional devices to test defects of the wiring.

SUMMARY OF THE INVENTION

Therefore, the present invention is intended to solve the above problems and an object of the present invention is to provide a liquid crystal display for testing defects that may be present in panel wiring capable of testing disconnection and short anomalies of the panel wiring when signals are applied, by connecting data line or gate line or common voltage line in a panel to each pad through wiring formed in a zigzag shape on the outside of the panel.

In order to accomplish the above object, the present invention comprises: a TFT array unit including a plurality of gate lines and data lines formed in a matrix shape, having TFT transistors at the intersection of each pair of gate lines and data lines; a data pad unit commonly connected to the plurality of data lines for receiving signals for driving the data line; and a wiring unit for testing defects of the data line being connected between the data pad unit and the data line for testing disconnection and short anomalies of the data line.

The data pad unit comprises a first data pad commonly connected to the odd data lines of the plurality of data lines for receiving signals for driving the odd data lines and a second data pad commonly connected to the even data lines of the plurality of data lines for receiving signals for driving the even data lines.

The wiring unit for testing defects of the data line further comprises a first wiring unit for testing defects of the data line, which is connected between the first data pad and the odd data line, normally used for testing disconnection and short anomalies of the odd data line, and a second wiring unit for testing defects of the data line, which is connected between the second data pad and the even data line and is used for testing disconnection and short anomalies of the even data line.

The first and the second wiring units for testing defects of the data line preferably are formed in a zigzag shape.

According to another embodiment of the present invention, a liquid crystal display for testing defects of wiring in a panel comprises: a TFT array unit including a plurality of gate lines and data lines formed in a matrix shape, having TFT transistors at the intersection of each of the gate lines and the data lines; a gate pad unit commonly connected to the plurality of gate lines for receiving signals for driving the gate line; and a wiring unit for testing defects of the gate line being connected between the gate pad unit and the gate line, used for testing disconnection and short anomalies of the gate line.

The gate pad unit further comprises a first gate pad unit commonly connected to the odd gate line of the plurality of gate lines for receiving signals for driving the odd gate line and a second gate pad unit commonly connected to the even gate line of the plurality of gate lines for receiving signals for driving the even gate line.

The wiring unit for testing defects of the gate line comprises a first wiring unit for testing defects of the gate line connected between the first gate pad and the odd gate line for testing disconnection and short anomalies of the odd gate line and a second wiring unit for testing defects of the gate line connected between the second gate pad and the even gate line, for testing disconnection and short anomalies of the even gate line.

The first and the second wiring units for testing defects of the gate lines preferably are formed in a zigzag shape.

According to still another embodiment of the present invention, a liquid crystal display comprises: a TFT array unit including a plurality of gate lines and data lines formed in a matrix shape, having a TFT transistor on each pixel at the intersection of the gate line and the data line; a common voltage pad unit for applying a common voltage to the common voltage line connected to each pixel; and a wiring unit for testing defects of the common voltage line connected between the common voltage line and the common voltage pad unit for testing disconnection and short anomalies of the common voltage line.

The common voltage pad unit comprises a first common voltage pad commonly connected to the odd common voltage line of the plurality of common voltage lines for receiving signals for driving the odd common voltage line and a second common voltage pad commonly connected to the even common voltage line of the plurality of common voltage lines, for receiving signals for driving the even common voltage line.

The wiring unit for testing defects of the common voltage line comprises a first wiring unit for testing defects of the common voltage line, connected between the first common voltage pad and the odd common voltage line for testing disconnection and short anomalies of the odd common voltage line and a second wiring unit for testing defects of the common voltage line, connected between the second common voltage pad and the even common voltage line for testing disconnection and short anomalies of the even common voltage line.

The first and the second wiring units for testing defects of the common voltage line preferably are formed in a zigzag shape.

According to the present invention, it is possible to test defects in the wiring of a panel by a conventional panel test method, thereby improving reliability of the panel.

DETAILED DESCRIPTION OF THE PREFERRED EMBODIMENTS

The above objects, and other features and advantages of the present invention will become more apparent after reading the following detailed description when taken in conjunction with the appended drawings.

Figure 1A:
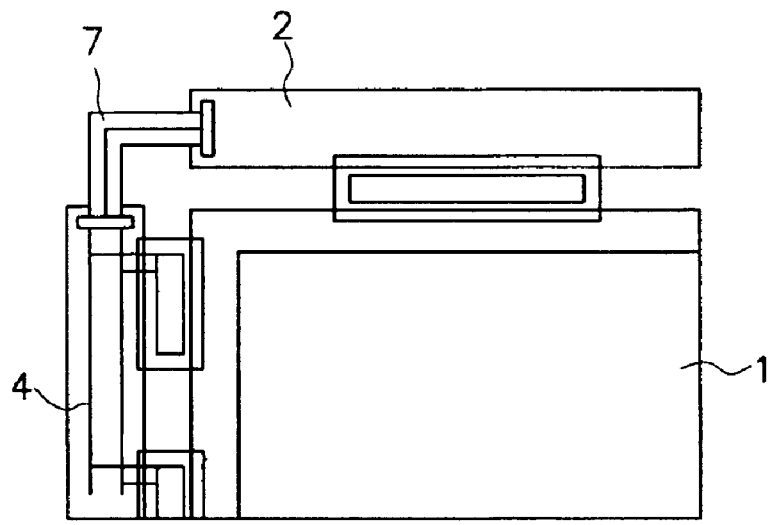
FIGS. 1A to 1C are drawings showing module structure of a general conventional liquid crystal display.
Figure 1B:
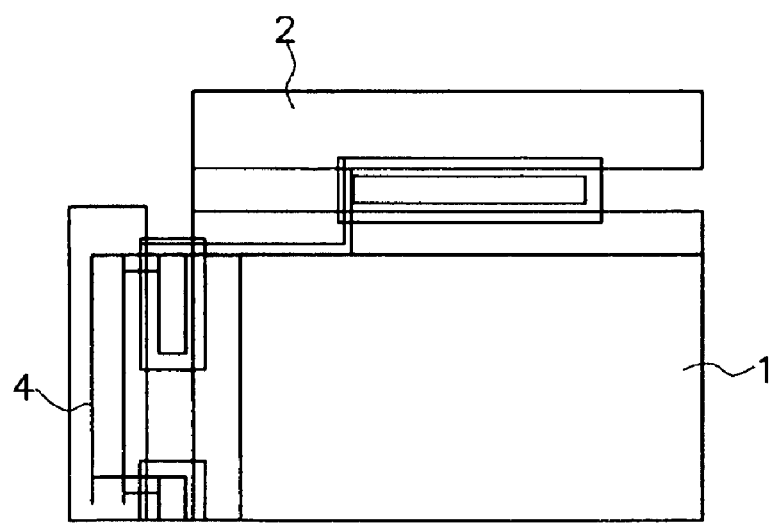
Figure 1C:
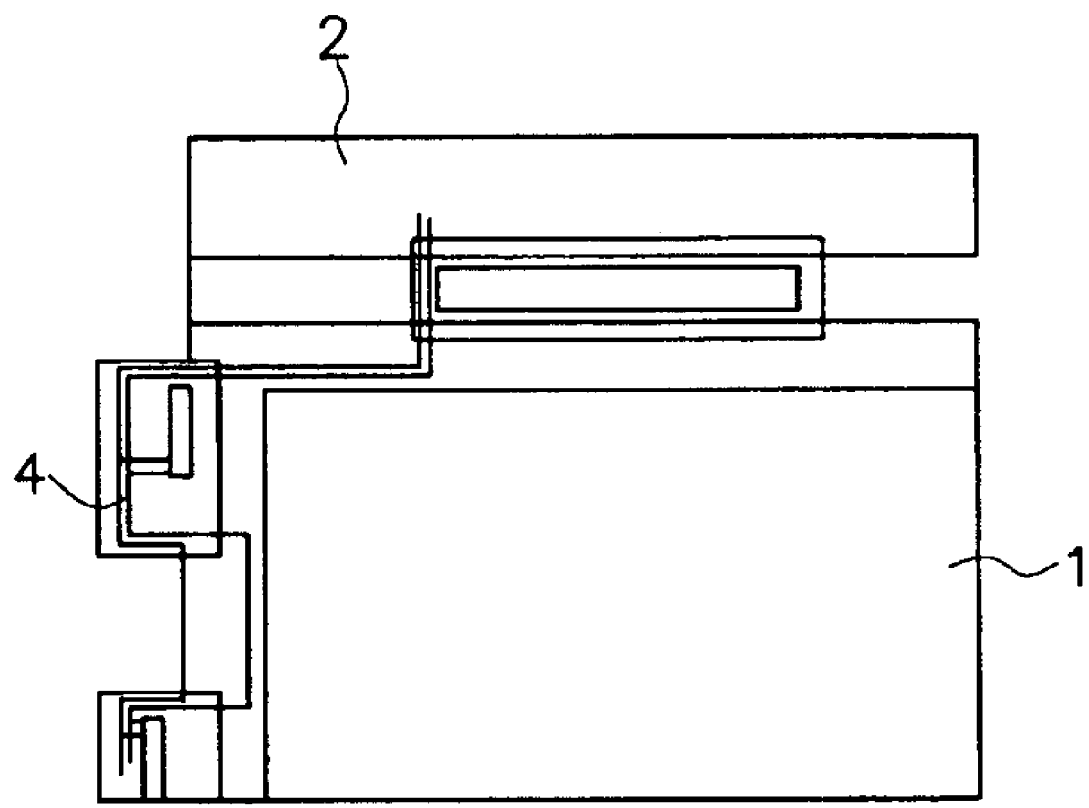
Figure 2:
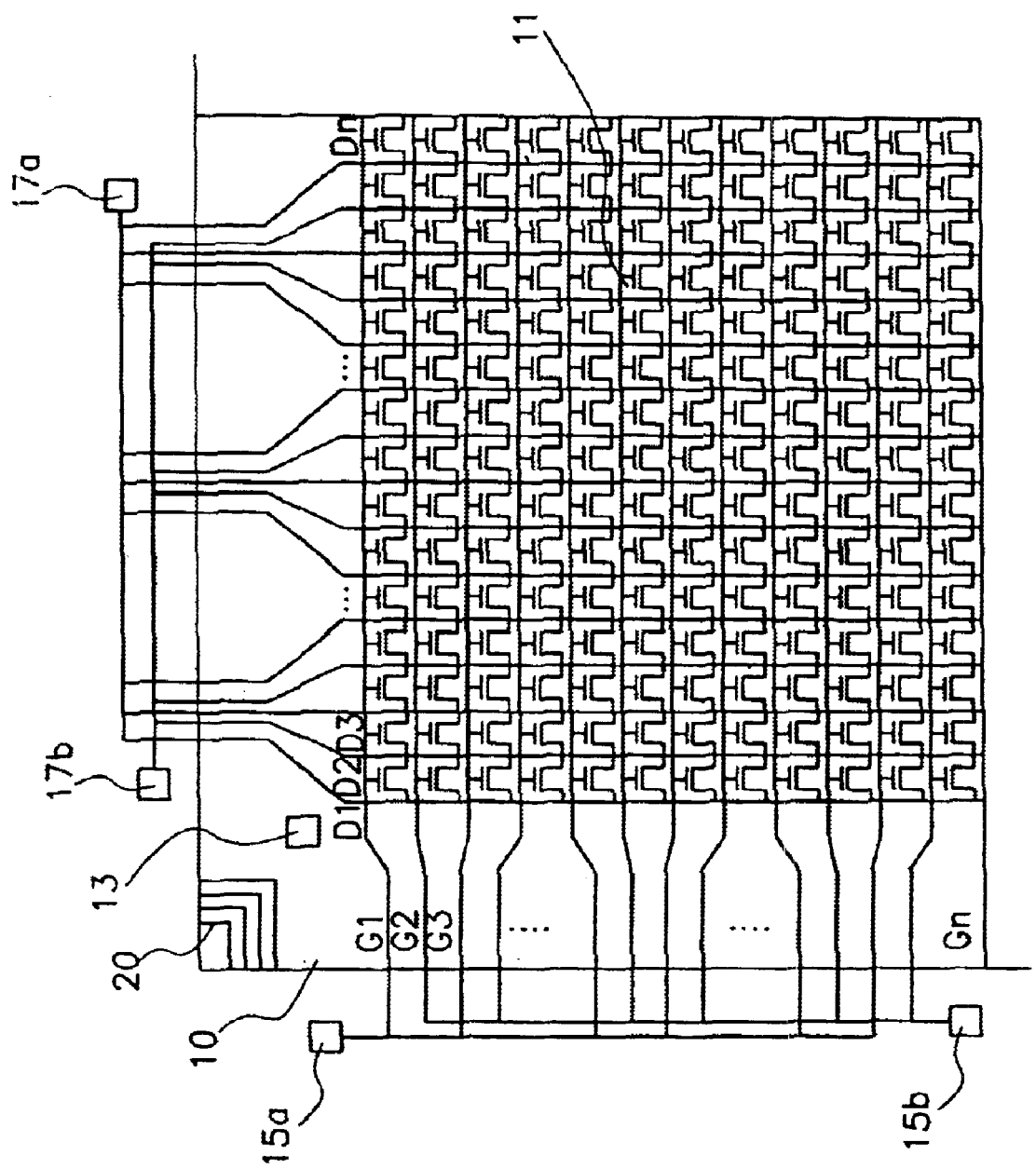
FIG. 2 is a drawing showing a conventional panel test method.
Figure 3A:
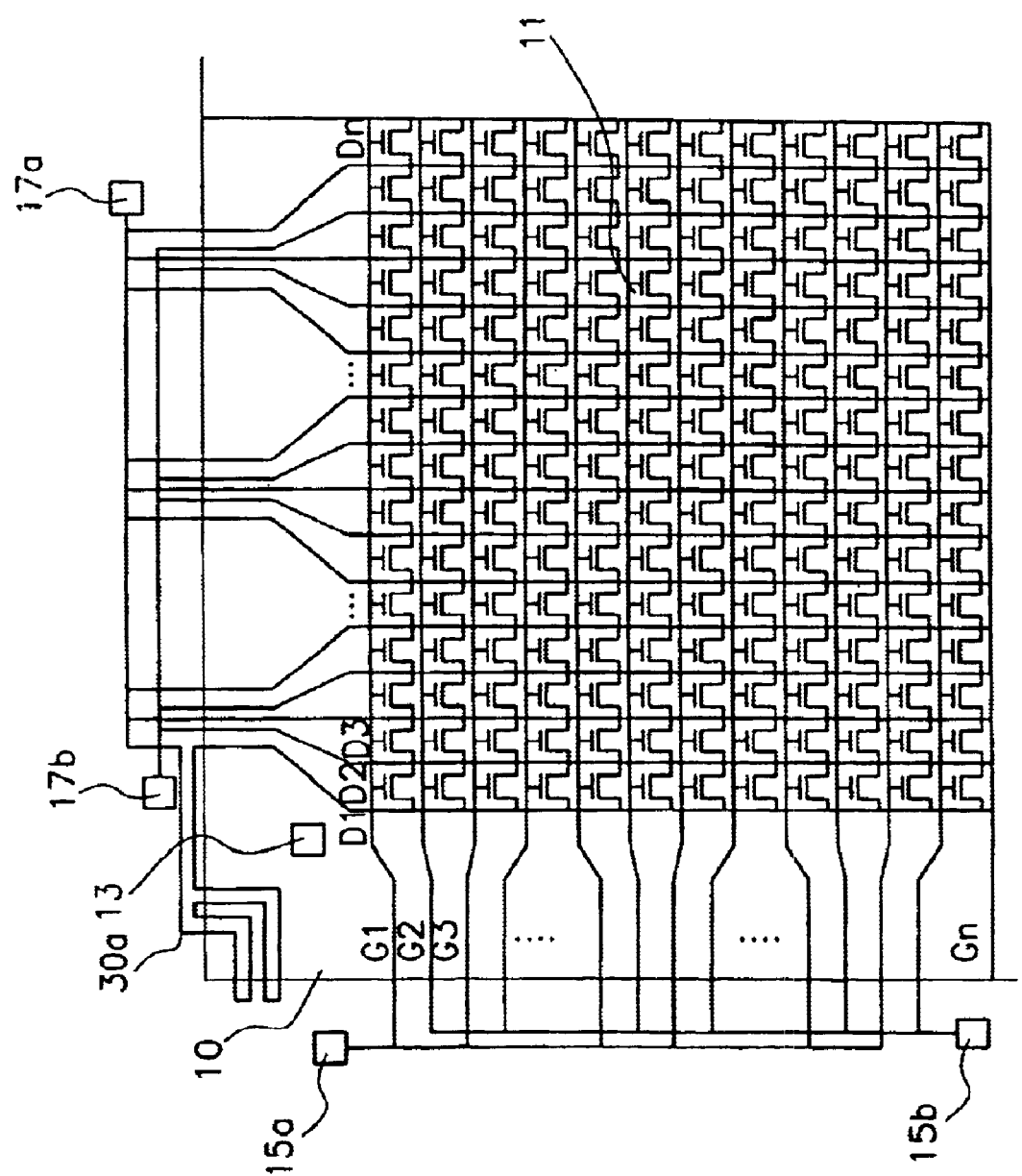
FIGS. 3A and 3B are block diagrams showing a liquid crystal display for testing defects of wiring in a panel according to the present invention.
Figure 3B:
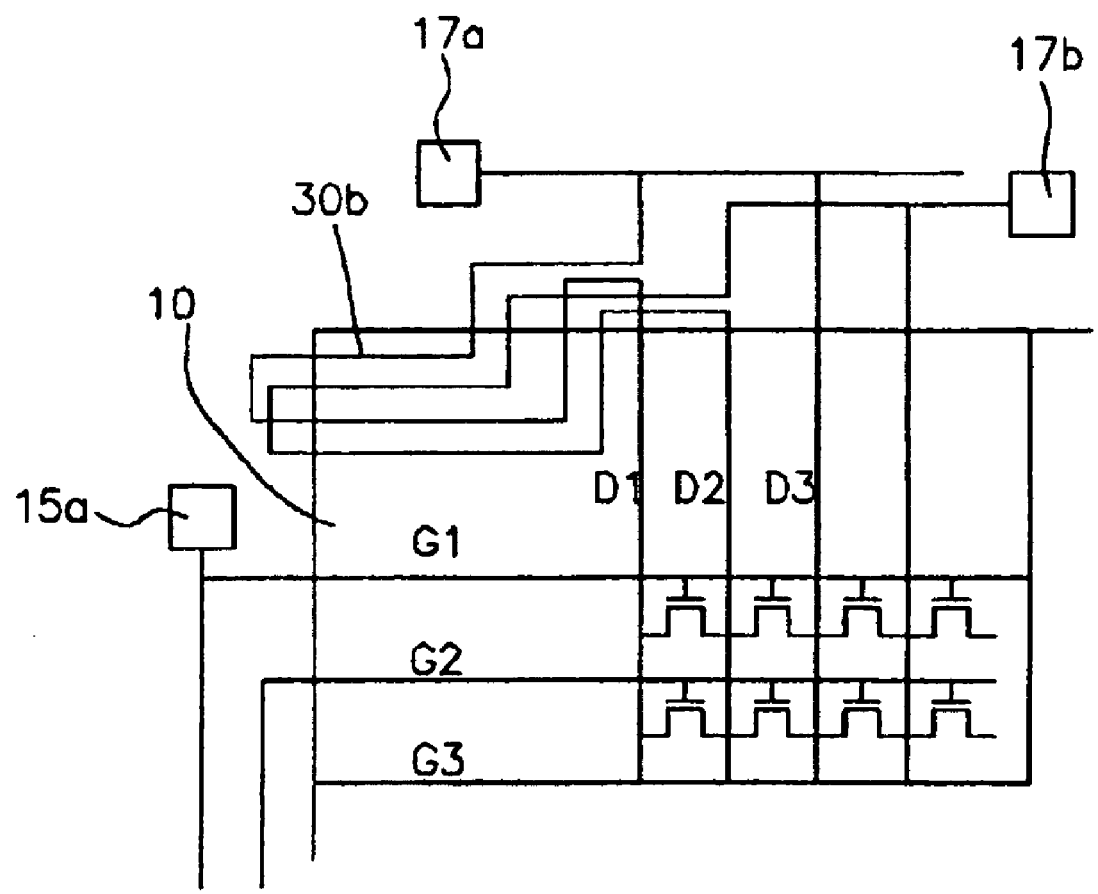

FIGS. 3A and 3B are drawings showing a method of testing wiring in a panel according to the present invention.

Referring to FIG. 3A, a TFT array unit 11 in a panel 10 is arranged with a plurality of gate lines G1, G2 . . . Gn and data lines D1, D2 . . . Dn from the TFT array unit. The odd lines of the gate lines G1, G2 . . . Gn are connected to a gate odd pad 15a and the even lines are connected to a gate even pad 15b. In the same manner, the data lines D1, D2 . . . Dn are connected to a data odd pad 17a and a data even pad 17b. The zigzag connection wiring 30a on the upper part of panel 10 is connected to a first line D1 of the data even pad 17b in series.

Referring to FIG. 3B, a test structure is formed in the same method as that in FIG. 3A. However, wiring is formed in a separated zigzag connection wiring pattern 30b and then, is connected to a first line D1 of data odd pad 17a and a first line D2 of data even pad 17b in series. Therefore, it is possible to test for disconnection and short anomalies of wiring by applying a signal for the test to data odd pad 17a and to data even pad 17b. When a short is generated, the TFT of the data even line, to which a signal is not applied, is also operated, as well as in the data odd line, to which a signal is applied.

Figure 4A:
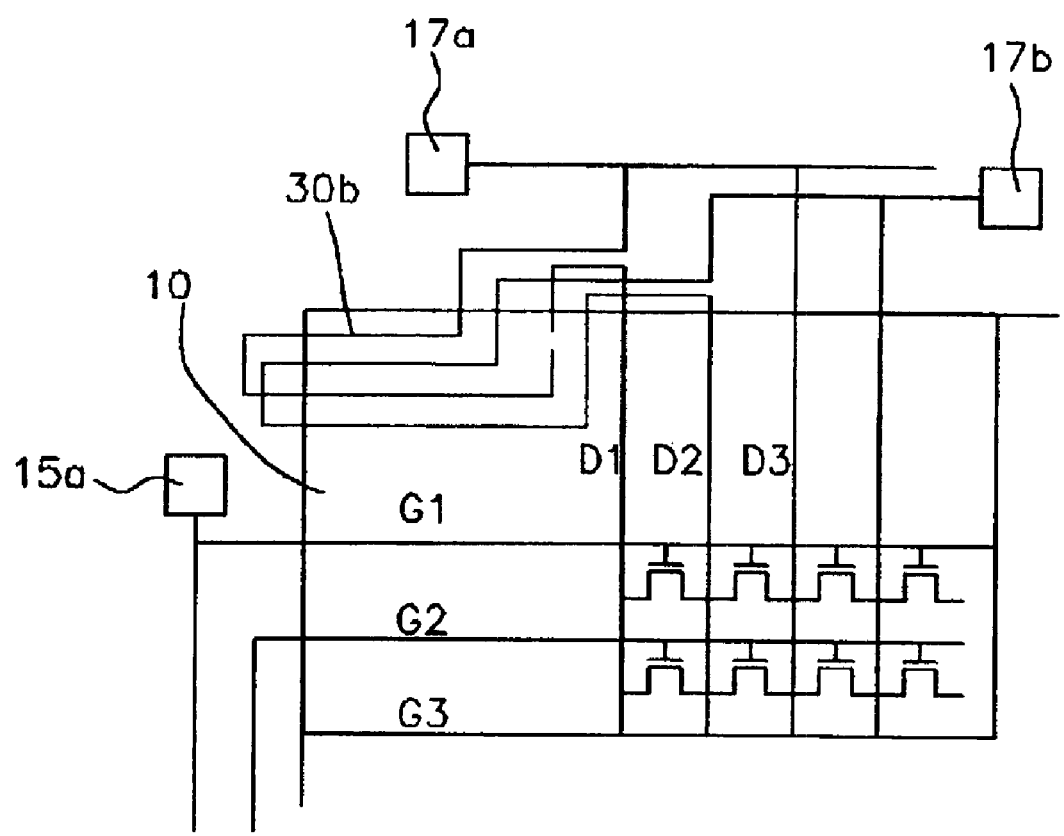
FIGS. 4A and 4B illustrate a method of testing disconnection and short anomalies of a wiring in a panel according to the present invention.
Figure 4B:
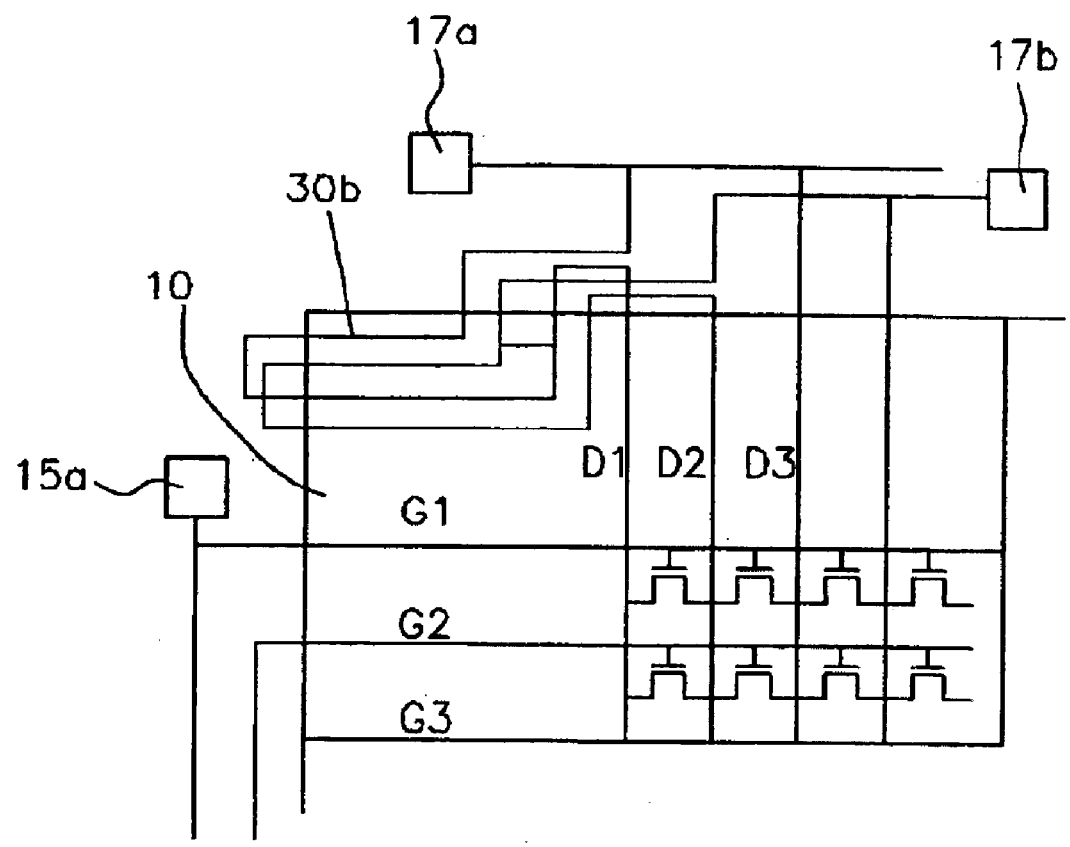

FIGS. 4A and 4B illustrate a method of testing disconnection and short anomalies of wiring in a panel according to the present invention.

Referring to FIG. 4A, when disconnection is generated between wiring of a panel, the disconnected wiring is connected to a first line D1 of data odd pad 17a. Therefore, when a signal is applied to the data odd pad 17a, the TFT of the disconnected first line D1 is not operated and the TFTs of other data odd lines D3, D5, etc. . . . are normally operated.

FIG. 4B shows a method of testing defects when a short is generated between wiring in a panel. Referring to FIG. 4B, the data odd pad 17a is connected to wiring connected to data even pad 17b. Therefore, when a signal is applied to the data odd pad 17a, the TFT of the first data line D1 is operated, as well as the TFT of the second data line D2, to which a signal is not applied. If the two are operated at the same time when a signal is applied to only one, it is determined that short defects are present.

Although it is not shown in the drawings, it is possible to also test defects by connecting the same method to gate odd pad 15a and gate even pad 15b and by connecting the zigzag wiring 30a to the common voltage Vcom pad 13 in series.

As described above, according to the present invention, it is possible to test defects of wiring in a panel by connecting wiring in a zigzag shape or by separating and connecting wiring in a zigzag shape and then connecting the resultant to the gate pad unit, the data pad unit and the common voltage pad unit.

According to the present invention, it is possible to omit a stand alone Flexible Printed Circuit FPC or a Printed Circuit Board PCB, thereby reducing manufacturing cost and the size of the resulting product.

Although preferred embodiments of this invention have been disclosed for illustrative purposes, those skilled in the art will appreciate that various modifications, alterations, additions and substitutions are possible, without departing from the scope and spirit of the invention as set forth in the following claims.

What is claimed is:

1. A liquid crystal display for testing defects of wiring in a panel, comprising:

a TFT array unit including a plurality of gate lines and data lines formed in a matrix shape, having TFT transistors at the intersection of each of the gate lines and data lines;

a data pad unit commonly connected to the plurality of data line for receiving signals for driving the data lines, wherein the data pad unit further comprises a first data pad commonly connected to the odd data lines of the plurality of data lines, for receiving signals for driving the odd data lines and a second data pad commonly connected to the even data lines of the plurality of data lines for receiving signals for driving the even data line; and a wiring unit for testing defects of the data line being directly connected between a line of the data pad unit and the data line for testing disconnection and short anomalies of the data line, wherein the wiring unit consists of at least one of a first wire and a second wire, the first wire being connected between the first data pad and the first odd data line, and the second data wire being connected between the second data pad and the first even data line.

2. The liquid crystal display according to claim 1, wherein the wiring unit for testing defects of the data line further comprises a first wiring unit for testing defects of the data line connected between the first data pad and the odd data line for testing disconnection and short anomalies of the odd data line and a second wiring unit for testing defects of the data line connected between the second data pad and the even data line, for testing disconnection and short anomalies of the even data line.

3. The liquid crystal display according to claim 2, wherein the first and the second wiring units for testing defects of the data line are formed in a zigzag shape.

4. The liquid crystal display for testing defects of wiring in a panel comprising:
- a TFT array unit including a plurality of gate lines and data lines formed in a matrix shape, having TFT transistors at the intersection of each gate line and data line;
- a gate pad unit commonly connected between the plurality of gate lines for receiving signals for driving the gate line, wherein the gate pad unit comprises a first gate pad commonly connected to the odd gate lines of the plurality of gate lines for receiving signals for driving the odd gate lines and a second gate pad commonly connected to the even gate lines of the plurality of gate lines for receiving signals for driving the even gate lines; and
- a wiring unit for testing defects of the gate line being directly connected between a line of the gate pad unit and the gate line for testing disconnection and short anomalies of the gate line,
- wherein the wiring unit consists of at least one of a first wire and a second wire, the first wire being connected between the first gate pad and the first odd gate line, and the second data wire being connected between the second gate pad and the first even gate line.

5. The liquid crystal display according to claim 4, wherein the wiring unit for testing defects of the gate line further comprises a first wiring unit for testing defects of the gate line connected between the first gate pad and the odd gate line for testing disconnection and short anomalies of the odd gate line and a second wiring unit for testing defects of the gate line connected between the second gate pad and the even gate line for testing disconnection and short anomalies of the even gate line.

6. The liquid crystal display according to claim 5, wherein the first and the second wiring units for testing defects of the gate line are formed in a zigzag shape.

7. A liquid crystal display for testing defects of wiring in a panel comprising:
- a TFT array unit including a plurality of gate lines and data lines formed in a matrix shape, having a TFT transistor in each pixel at the intersection of each gate line and data line;
- a common voltage pad unit for applying a common voltage to a common voltage line connected to each pixel, wherein the common voltage pad unit comprises a first common voltage pad commonly connected to the odd common voltage line of the plurality of common voltage lines for receiving signals for driving the odd common voltage line and a second common voltage pad commonly connected to the even common voltage lines of the plurality of common voltage lines for receiving signals for driving the even common voltage line; and
- a wiring unit for testing defects of the common voltage line connected between the common voltage line and the common voltage pad unit for testing disconnection and short anomalies of the common voltage line.

8. The liquid crystal display according to claim 7, wherein the wiring unit for testing defects of the common voltage line further comprises a first wiring unit for testing defects of the common voltage line connected between the first common voltage pad and the odd common voltage line for testing disconnection and short anomalies of the odd common voltage line and a second wiring unit for testing defects of the common voltage line connected between the second common voltage pad and the even common voltage line for testing disconnection and short anomalies of the even common voltage line.

9. The liquid crystal display according to claim 8, wherein the first and the second wiring units for testing defects of the common voltage line are formed in a zigzag shape.

* * * * *